US010300758B2

(12) United States Patent
Guest et al.

(10) Patent No.: US 10,300,758 B2
(45) Date of Patent: May 28, 2019

(54) VEHICLE SUSPENSION SYSTEMS

(71) Applicant: Jaguar Land Rover Limited, Whitley, Coventry, Warwickshire (GB)

(72) Inventors: Philip Guest, Warwick (GB); David Waide, Worcester (GB); Rory Manning, Leamington Spa (GB); Adam Grzywaczewski, Coventry (GB); David Grace, North Littleton (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 81 days.

(21) Appl. No.: 15/324,648

(22) PCT Filed: Jul. 7, 2015

(86) PCT No.: PCT/EP2015/065468
§ 371 (c)(1),
(2) Date: Jan. 6, 2017

(87) PCT Pub. No.: WO2016/005385
PCT Pub. Date: Jan. 14, 2016

(65) Prior Publication Data
US 2017/0203626 A1 Jul. 20, 2017

(30) Foreign Application Priority Data
Jul. 8, 2014 (GB) .................................. 1412115.6

(51) Int. Cl.
*B60G 17/016* (2006.01)
*B60G 17/017* (2006.01)
(Continued)

(52) U.S. Cl.
CPC ......... *B60G 17/017* (2013.01); *B60G 17/016* (2013.01); *B60G 17/019* (2013.01);
(Continued)

(58) Field of Classification Search
CPC ............ B60G 2800/202; B60G 17/017; B60G 17/0165; B60G 17/019; B60G 2400/82;
(Continued)

(56) References Cited

U.S. PATENT DOCUMENTS 5,452,919 A * 9/1995 Hoyle ................ B60G 17/0155
280/5.505
5,466,007 A 11/1995 Smith
(Continued)

FOREIGN PATENT DOCUMENTS

DE 102004017986 A1 11/2005
EP 1693234 A2 8/2006
(Continued)

OTHER PUBLICATIONS

Combined Search and Examination Report for application No. GB1412115.6, dated Jan. 12, 2015, 8 pages.
(Continued)

*Primary Examiner* — Laura Freedman
(74) *Attorney, Agent, or Firm* — Reising Ethington P.C.

(57) ABSTRACT

A ride-height adjustment system for a vehicle. The system has a first detector, to detect a preliminary end-of-journey (EOJ) event, such as seat belt unbuckling or ignition switch-off. A controller adjusts the vehicle's suspension system in a first movement in response to detection of the preliminary EOJ event, to change the ride height of the vehicle towards an access ride height of the vehicle. The access ride height is a predetermined ride height that facilitates egress from and entrance to the vehicle. A second detector detects opening of a door of the vehicle. When the ride height of the vehicle remains different from the access ride height after the first movement, the controller adjusts the suspension system in a second movement in response to the door-
(Continued)

opening detection. This further changes the ride height of the vehicle towards the access ride height of the vehicle.

20 Claims, 3 Drawing Sheets

(51) Int. Cl.
*B60G 17/019* (2006.01)
*B60G 17/0165* (2006.01)

(52) U.S. Cl.
CPC ...... *B60G 17/0165* (2013.01); *B60G 2400/82* (2013.01); *B60G 2400/952* (2013.01); *B60G 2400/96* (2013.01); *B60G 2500/30* (2013.01); *B60G 2800/202* (2013.01); *B60G 2800/226* (2013.01)

(58) Field of Classification Search
CPC .......... B60G 2400/952; B60G 2400/96; B60G 2500/30; B60G 17/016; B60G 2800/226
See application file for complete search history.

(56) References Cited

U.S. PATENT DOCUMENTS

| | | | | |
|---|---|---|---|---|
| 5,588,368 A * | 12/1996 | Richter | .................. | B60G 11/48 105/158.2 |
| 6,726,189 B2 * | 4/2004 | Folchert | ............ | B60G 17/0523 267/64.16 |
| 7,607,672 B2 | 10/2009 | Suzuki et al. | | |
| 8,217,755 B2 * | 7/2012 | Martin | .................... | E05F 15/79 180/289 |
| 8,285,448 B2 * | 10/2012 | Inoue | .................... | B60G 15/08 280/5.514 |
| 8,413,997 B1 | 4/2013 | Coombs et al. | | |
| 9,101,519 B2 * | 8/2015 | Smith | .................... | A61G 3/061 |
| 9,272,596 B2 * | 3/2016 | Schallmeier | ....... | B60G 17/0155 |
| 9,358,854 B1 * | 6/2016 | Sandbulte | ............ | B60G 17/017 |
| 9,545,927 B2 * | 1/2017 | Fairgrieve | ........... | B60W 50/082 |
| 9,884,626 B2 * | 2/2018 | Kelly | .................. | B60W 50/082 |
| 2006/0142916 A1 | 6/2006 | Onuma et al. | | |
| 2006/0186728 A1* | 8/2006 | Mizuta | ............... | B60G 17/0152 303/3 |
| 2014/0095023 A1 | 4/2014 | Myggen et al. | | |

FOREIGN PATENT DOCUMENTS

| | | |
|---|---|---|
| FR | 2978941 A1 | 2/2013 |
| GB | 2346592 A | 6/2000 |
| JP | H01233111 A | 9/1989 |
| JP | 2004345473 A | 12/2004 |
| JP | 2008120190 A | 5/2008 |
| JP | 2008293210 A | 12/2008 |
| WO | WO9305970 A | 4/1993 |

OTHER PUBLICATIONS

International Search Report for International application No. PCT/EP2015/065468, dated Sep. 17, 2015, 4 pages.
Written Opinion for International application No. PCT/EP2015/065468, dated Sep. 17, 2015, 7 pages.
Japanese Office Action in Japanese with English summary for JP application No. 2017-501029, dated Feb. 13, 2018, 8 pages.

* cited by examiner

Flowchart Key - (A1 to A15)

| | |
|---|---|
| A1 | Suspension at Normal or Speed Lowered height? |
| A2 | Doors opened? |
| A3 | 'Yes' to all auto access activation conditions? |
| A4 | Occupants appear to be about to exit vehicle? |
| A5 | 'Yes' to all auto access activation conditions? |
| A6 | Go to intermediate Access height e.g. 18mm below Normal height |
| A7 | Speed exceeds threshold? e.g. 40kph |
| A8 | Go to Normal ride height |
| A9 | Doors opened? |
| A10 | 'Yes' to all auto access activation conditions? |
| A11 | Driver selects full access height |
| A12 | Go to full Access height, e.g. 50mm below Normal height |
| A13 | 'Yes' to one auto access exit condition? |
| A14 | Go to Normal ride height or another height defined by driver or TR request |
| A15 | Either:<br>1. Go to full Access height, e.g. 50mm below Normal height<br>2. Go to a defined height close to full Access height<br>OR<br>3. Go towards full Access height for a defined period of time e.g. 3s |

Figure 3 Continued

VEHICLE SUSPENSION SYSTEMS

TECHNICAL FIELD

The present disclosure relates to vehicle suspension systems and in particular but not exclusively to systems capable of changing ride height to facilitate egress from the vehicle at the end of a journey, as well as entrance to the vehicle at the start.

BACKGROUND

Some vehicles have two characteristics, among others. A first is that their ride height during normal operation is such that egress from and entrance to the vehicle is not as easy or convenient as it might be. Depending on the type of vehicle, the height could be lower or higher, to suit most people. With sports utility vehicles (SUVs) that have off road capabilities, the ride height of the vehicle, and thus of the passengers in the vehicle, is high, so that the vehicle has substantial ground clearance over rough terrain, as well as giving the driver and passengers a good viewing position to survey the ground being traversed. On the other hand, sports cars, or high performance cars frequently have a low ride height, because they will typically be driven only on good road surfaces and a low vehicle gives a low centre of gravity which improves vehicle handling, for example by reducing roll during cornering. A second characteristic of some vehicles is adjustable suspension for the vehicle, whereby the ride height can be adjusted. Typically, but not exclusively, such suspension systems are gas suspension systems (usually air, and referred to as such hereinafter) where ride height depends on the mass of air in the suspension system, which may be adjusted by operation of a pump (to increase pressure), or of a valve (to reduce pressure). The pressure is often in the region of 3 to 20 bar. Such air suspension may be provided in both SUVs and sports cars, although for different reasons. The higher the ride height of the vehicle, the more suspension travel the vehicle provides, although the comfort of the ride in the vehicle generally depends on their being the capability of suspension travel in both directions (i.e. up in the case of bumps being experienced or down in the case of holes). In both types of vehicle, the "normal" ride height for everyday situations may be a first height, whereas less usual situations may invoke a different, second ride height—higher in SUVs for off-road applications, and lower for sports cars when the driver wants to enter a sports driving mode. However, in SUV vehicles it may also be desirable to lower the suspension during extended road driving.

For an SUV, when it is in a raised suspension condition, or even in an intermediate position, passengers may be required to make a significant step up (for entrance into) or step down (for exit from) the vehicle, and conversely for a sports car or some performance cars.

It is known to lower vehicle suspension when a journey in a vehicle terminates and a driver (and any passenger(s)) is to leave the vehicle. An end-of-journey event is detected in the known systems and pressure is relieved from the suspension system when that occurs so that the vehicle sinks to its lowest suspension setting. However, an issue is that air suspension systems typically take a number of seconds (perhaps five or more) to evacuate completely and lower the vehicle to its rest height. Therefore the vehicle may still be in the process of lowering as a passenger egresses from the vehicle. This has some safety issues, as well as being disconcerting for passengers, who cannot then tell what height the ground is from their position if the vehicle is changing height while they are exiting.

It is an object of the present invention to provide a suspension system for a vehicle, and a vehicle incorporating such system, with improved end of journey arrangements, or at least to provide a system that addresses the above issues and mitigates some of the problems discussed.

SUMMARY OF THE INVENTION

According to an aspect of the invention for which protection is sought, there is provided a ride-height adjustment system for a vehicle, the system comprising:

a suspension system, which is adjustable to change the ride height of the vehicle;

first means, to detect a preliminary end-of-journey (EOJ) event;

a controller, to adjust the suspension system in a first movement in response to detection of said preliminary EOJ event, to change the ride height of the vehicle towards an access ride height of the vehicle, which access ride height is a predetermined ride height that facilitates egress from and entrance to the vehicle; and second means, to detect a decisive EOJ event, wherein, when the ride height of the vehicle remains different from the access ride height after said first movement, the controller is adapted to further adjust the suspension system in a second movement in response to said decisive EOJ event detection, to further change the ride height of the vehicle towards said access ride height of the vehicle.

Said first and second means may comprise:

an electronic processor having an electrical input for receiving signals indicative of said preliminary EOJ event and said decisive EOJ event; and an electronic memory device electrically coupled to the electronic processor and having instructions stored therein; wherein the processor is configured to access the memory device and execute the instructions stored therein such that it is operable in response to said preliminary EOJ event and decisive EOJ event to adjust the suspension system in said first and second movements.

Said decisive EOJ event may comprise opening of a door of the vehicle.

The controller may be arranged to stop said adjustment of the suspension system in said second movement after a predetermined maximum change of ride height has occurred or after a maximum period of time has elapsed since said door-opening detection, or if the vehicle reaches said access ride height.

The controller may be arranged to stop said adjustment of the suspension system in said first movement after a predetermined maximum change of ride height has occurred or after a maximum period of time has elapsed since said detection of said preliminary EOJ event.

In one embodiment, the changes of ride height are lowerings of the ride height. Such is the case in SUVs where the normal ride height may be relatively elevated above the ground, compared with smaller saloon-type passenger vehicles, and pose a minor challenge for passengers to enter and egress.

The present invention thus provides a two-stage movement of the suspension system that has one primary aim. That aim is that the second movement is small enough to achieve (or at least approach) reaching the access height before a driver or passenger will typically have touched the ground during exiting of the vehicle and after commencing opening a door of the vehicle. In trials, this is found to be seldom less than three seconds after commencement of door opening, although the speed at which different people exit their vehicles at different times clearly can vary substantially. The term "door opening" is not to be understood as limited to movement of the door, but may include operation of a door opening switch or handle of the door, or alternatively the proximity of a user's hand to a door switch or handles for example using capacitive sensing.

However, three seconds is generally not enough time to lower a typical SUV to its access height from its normal running height, and certainly not from the height to which it might be elevated in off-road situations. It would be feasible to speed up this lowering, but this is not desirable for at least two reasons. The first is that lowering the vehicle at such a rate is potentially disturbing, uncomfortable or alarming for the occupants of the vehicle, or indeed for bystanders. Secondly is the fact that the speed of lowering or raising the suspension of a vehicle is restricted by the constraints of the system, airline size, valve size, pneumatic tube length etc. which are sized based on a number of often contradictory requirements including space envelope, component life, component cost, noise and vibration requirements to name a few. In addition escaping air on lowering may be used to regenerate elements of an air dryer of the system, regeneration of which is better at lower air flows. All these factors contribute to a system designed around a particular airflow so merely allowing air to escape more quickly, although possibly advantageous for the speed of suspension lowering, may adversely affect other system requirements.

Given the foregoing consideration, the invention proposes an initial first lowering of the suspension before the door opening event, which event is fairly conclusive that a vehicle has reached the end of its journey and the suspension can indeed be lowered with confidence that it does not immediately have to be raised because the journey has not, in fact, ended. However, there are indicators that suggest an EOJ event with a reasonable degree of probability. The present invention provides that, when a preliminary EOJ event is detected, an initial lowering of the suspension is commenced. Then, should the EOJ be confirmed by a decisive EOJ event, then lowering can be completed to access height. Essentially, only different levels of probability that the journey has ended distinguish preliminary EOJ events from decisive EOJ events. Reasonable certainty may be the level of confidence needed to achieve a preliminary expectation of the end of a journey, whereas high level of certainty might required in the case of a decisive expectation. What actually triggers each level is up to the vehicle designer to select and both presuppose an element of error and uncertainty.

One such preliminary end-of-journey (EOJ) event is the ignition being switched off. A second preliminary EOJ event is one or more seat belts being unbuckled. Consequently, when either of these events is detected, the controller may trigger said first movement. However other preliminary end-of-journey (EOJ) event indicators also exist and our co-pending application, UK patent application number GB1412109.9 (the content of which is incorporated herein by reference), describes other vehicle systems that can be switched into an EOJ mode of operation when an EOJ event is predicted, (including the possibility of an "elegant arrival", that is lowering of the suspension and silencing of an internal combustion engine (in a hybrid vehicle)).

Knowledge that an end-of-journey (EOJ) event is about to happen can be exploited in order to substantially enhance the driving experience during the last leg of the journey by automating several actions related to the end-of-journey process. For example, when the driver is engaged with parking maneuvers, he or she would frequently benefit from automatic activation of i) front, rear and side-cameras (if present in the vehicle) and ii), surround lighting to facilitate observation of obstacles.

In order to trigger the features above mentioned (and many more), the vehicle system may be provided with an EOJ predictor algorithm as described in UK patent application number GB1412109.9. Being able to predict the end of the journey is a very valuable piece of information within the automotive context. Knowing that a driver is about to finish the journey allows the vehicle system to prepare for the event and activate a number of convenient features automatically. Predicting when the journey is about to finish, in significant advance of the finish, is a non-trivial problem, although in the present invention generally quite "safe" and reliable indicators can be exploited, as described above, including seat belt unbuckling or engine ignition disabling. However, the earlier a prediction is required, the more complex the problem becomes. One of the approaches for understanding that the journey is close to its end is the parking maneuver detection. Hence, detecting that the user is currently engaged in a parking process would indicate with high level of confidence about the driver intention to finish the journey.

The disclosure in UK patent application number GB1412109.9 (whose content is incorporated herein by reference) details a system that is capable of learning how individuals park at certain destinations, by observing characteristic indicators and providing the in-vehicle computer system with a prediction of whether the driver is currently engaged in a parking maneuver and, therefore, finishing the journey.

Predicting an EOJ event is not trivial. A vehicle simply coming to a halt is not a safe predictor (despite being a necessary precursor of an EOJ event). In any event, coming to a halt is often too late to be of use. Nevertheless, there are a number of parameters that can be employed and in one embodiment the EOJ predictor is provided with one or a combination of the following vehicle parameters or contextual data on the basis of which to predict an EOJ event:

Speed: Speed is a clear indicator of the intention of the driver to park. The parking maneuvers typically occur at low speeds (<10 Km/h).

Acceleration and braking: Parking maneuvers follow certain patterns on acceleration and breaking. Detecting those patterns can be used as clear indicators of a parking maneuver event.

Steering wheel angle: The sequence of movements of the steering wheel during the parking typically differs from the movements during normal driving.

Seatbelt unbuckling (driver and passengers). The unbuckling event can be used as an indicator that the user is getting ready to leave the car.

Gear mode: The parking event is typically preceded for a certain changes of gears, forward and reverse. Also, higher gears will discard parking events.

Directional Indicators: These indicators should anticipate some certain maneuvers, such as parking or stopping events.

Parking System: Some vehicles are provided with auto parking systems that a driver can initiate for parking in a parking bay of a car park or for parallel parking in a space between vehicles aligned at the side of the road.

Others: such as pedal pressure, direction indicators, inside and outside cameras and radar, and of course engine ignition disabling.

In addition GPS and map data may be employed.

Current x,y coordinates: Knowing the current position of the vehicle can help to increase the confidence that steering angle changes are a parking maneuver.

Historical x,y coordinates: A location area where repeatedly EOJ events have occurred in the past may be a strong indicative of an EOJ event with a high degree of confidence.

Map Information: Having information about the surroundings of the vehicle can increase the accuracy of the system. For instance, knowing that the car is entering a parking area (e.g., shopping centre, airport, etc.) will increase the probability of an end-of-journey event. Conversely, being on a motorway will dramatically decrease the probability of an EOJ event although the vehicle might be stationary (e.g., traffic jam situation). Note that this data may be combined with current x,y coordinates of the vehicle.

Destination Prediction: Based on historical data, this input will give information on the probability of an EOJ event based on already-recorded destinations.

Thus, one or more of said vehicle parameters may be monitored as they change during a journey and a set of said measurements over a predetermined period of time may be collected and compared with stored sets of corresponding data to produce an output comprising a prediction of an EOJ event within a given time frame or distance to be travelled by the vehicle and a level of confidence that the EOJ event will occur in that time frame or distance.

For example, over a period of, say, two minutes, the steering angle of the steering wheels may be measured and recorded as a set of steering angles at specific time points (e.g. each separated by one second). This set may be compared with stored sets of steering angle measurements made over corresponding time periods and that resulted in an end of journey event. A degree of similarity may be determined and hence a probability that the current set of steering angle measurements is the precursor of an end of journey event.

However, such a procedure would be intensive in terms of processing and storage. In one embodiment, pre-processing of a subset of the set of said measurements is effected comprising a Fourier transform of said subset in respect of a period of time over which said subset of measurements is collected to produce a set of the coefficients of the frequency components of said subset, said set of coefficients comprising the set compared with said stored set that also comprises coefficients of frequency.

That is, instead of storing the actual measurements that are made, a set of (a relatively large number of) measurements is pre-processed to produce a set of (a relatively small number of) coefficients of frequencies of change in the measurements actually made. The frequencies of change of measurement will range between zero change and a maximum rate of change. A particular pattern of frequencies and the extents or coefficients of certain frequencies may be highly indicative of an end of journey event.

This disclosure focuses on the particular mode of operation employed when an EOJ event is predicted, rather than the prediction itself and it will be appreciated that whereas some EOJ events are described herein any suitable EOJ event may be employed. All predictions based on changes of vehicle parameters are susceptible to error. Thus, not every time a seat belt is unbuckled will a journey end. Research indicates that an EOJ event actually occurs only 90% of the time a seat belt is unbuckled in a vehicle. Likewise, some drivers choose to disable the engine (turn off the ignition) while waiting at traffic lights or in traffic queues, so this is not a 100% indicator of an EOJ event. Indeed, even opening a door is not an absolute precursor of an EOJ event, as passengers may wish to check their doors are closed or that clothing is not trapped in the door while the journey proceeds.

Thus, the first movement of the vehicle suspension is generally selected so as to achieve two aims. The first aim is to ready the vehicle for the second indication so that the second and final lowering of the suspension can be effected in about three seconds and sufficient to lower the car to the desired access height without it having to lower too quickly for comfort and safety. The second aim is to lower the suspension only so much that, if the preliminary end-of-journey (EOJ) event indication is false, and the journey in fact continues, the suspension has not lowered so much that ride comfort or vehicle handling is materially affected. There is also a further reason for a limited first movement, which is that air suspension is driven by a compressor that operates at high pressures, in the region of 15 to 20 bar, and repeated duty cycling of the compressor will increase wear on that component and this is desirably to be avoided or reduced when unnecessary.

In one embodiment, therefore, several limiting parameters may be detected to prevent said first movement from occurring. For example, in the case of drivers that like to switch off the vehicle ignition in certain situations while in-journey, the controller can be arranged to respond to an ignition disablement only if, on the last occasion that the ignition was disabled it was followed by a door opening event. If a driver on a journey then disables the ignition but does not exit the vehicle before re-engaging the ignition, the next time the ignition is disabled the foregoing requirement is not satisfied and the controller does not initiate said first movement.

Likewise, in the event that a vehicle seat belt is unbuckled, the controller at first merely records this fact. If this is the only EOJ event parameter detected, and the vehicle does not actually come to a halt within one minute (or within some other predetermined time period), the first movement may not be initiated and the fact of the seat belt unbuckling is "forgotten" by the controller after that time. With more sophisticated EOJ prediction technology such as described in UK patent application number GB1412109.9, the probability of an EOJ event on the basis of a single seat belt unbuckling may be corroborated by another event (for example approaching a location where EOJ events usually occur), in which case the first movement can be initiated with confidence even if the vehicle is not stationery.

Indeed, in some instances, it is desirable that further movement of the vehicle is permitted despite the initial lowering of the suspension. For example, when parking, it may be desirable to be at a preliminarily lowered suspension height during maneuvering of the vehicle to assist visibility of curbs, obstacles and the like. Consequently, an upper limit of vehicle speed after initiation of the first movement may be set before the suspension is returned to normal driving mode. That is, once this speed is exceeded, the first movement is reversed and the vehicle returned to normal running mode. Normal running mode in this respect may be a factory-fitted, default running mode, a running mode selected by the driver or a customized running mode. In any event it is returned to the condition before the first movement was initiated. In one embodiment, the maximum or threshold speed is 40 kph.

The extent of the first and second movements in terms of absolute distance will vary from vehicle to vehicle. In one embodiment the first movement is between 15 and 25 mm, indeed it may be 18 mm. The second movement may be between 25 and 40 mm, indeed it may be 32 mm. This assumes a total suspension movement of a maximum of 55 mm, but this may again be from a normal operating height to the desired access height. If the vehicle is in an off-road mode of operation the current ride height may be higher. However, because of the trap hazard that lowering suspension represents when the vehicle is stationary and with doors open, the total movement of the suspension is preferably limited to about 50 mm.

In the event that said preliminary EOJ indication is not detected, but the vehicle is stationary and the doors opened (for example, this situation will potentially pertain where drivers have at least once switched off the ignition without ending the journey, although it could also be that unbuckling a seat belt, switching off of the ignition and opening of a door could be all but simultaneously achieved) then the second movement (which in these cases are not a "second" movement within the terms of the present invention) may be greater. Nevertheless, it may still be limited to less than full suspension travel to mitigate the trap hazard problem. For example, the movement may be limited in time to 5 seconds. Alternatively, the speed may be increased so that greater reduction in height is achieved in the 3 seconds that is desirably permitted. In one embodiment, the maximum change permitted with the doors open is between 35 and 40 mm.

Incidentally, should the doors be closed once the second movement has been effected, the second movement (and the first movement) are not reversed and the vehicle returned to normal ride height unless and until a certain speed has been exceeded. The limit may be 7 kph. Indeed, a speed between 7 and 15 kph may be permitted (without resetting the suspension) provided it does not persist for longer than a predetermined time period, for example 3 seconds. Once the vehicle exceeds 15 kph, this could be set as an absolute limit before the suspension is reset.

The forgoing description assumes that the second movement is initiated by a door-opening event. This is largely because the changing of the height of the suspension is associated with the act of exiting a vehicle, for ergonomic reasons. That presupposes that a door opens. However, it is also tied to the door opening event because that is a decisive EOJ event which is extremely straightforward to detect and respond to. Door opening, especially when preceded by a preliminary EOJ event, such as ignition switch off or seatbelt unbuckling, is almost invariably followed by a passenger exiting the vehicle and, as such, is a "true" EOJ event. A decisive EOJ event is needed because driving the vehicle in its access ride-height mode for any period of time is not desirable for a number of reasons. If the "decisive" EOJ event turns out to be false, this results in unnecessary cycling of the compressors which operate the suspension system.

Nevertheless, as a trigger for the second movement, there may be other decisive EOJ event indicators that may be employed instead of door opening. Indeed, completing the lowering of the suspension before the doors actually open is in fact desirable. As mentioned above, such triggers could be provided by an on-board EOJ event predictor as described in our copending application mentioned above. For example, such a system may store coefficients that are highly indicative of an EOJ event, such as geographical position and steering arms movements. Thus the present invention is not limited to the door opening event but to any decisive EOJ event. In that respect, the terms preliminary EOJ event and decisive EOJ event should be understood to be relative to one another in terms of the confidence with which an EOJ event is about to happen, and the imminence thereof.

According to another aspect of the invention for which protection is sought, there is provided a method of adjusting the ride height of a vehicle comprising the steps of:
providing the vehicle with a suspension system that is adjustable to change the ride height of a vehicle in which it is fitted;
detecting a preliminary end-of-journey (EOJ) event;
using a controller, adjusting the suspension system in a first movement in response to said detection of said preliminary EOJ event, to change the ride height of the vehicle towards an access ride height of the vehicle, which access ride height is a predetermined ride height that facilitates egress from and entrance to the vehicle;
detecting a decisive EOJ event; and
when the ride height of the vehicle remains different from the access ride height after said first movement, further adjusting the suspension system in a second movement in response to said decisive EOJ event detection, to further change the ride height of the vehicle towards said access ride height of the vehicle.

Said decisive EOJ event may comprise opening of a door of the vehicle, and/or said preliminary EOJ event may be one of:
an ignition system of the vehicle being switched off; and
one or more seat belts of the vehicle being unbuckled.

The adjustment of the suspension system may cease in said second movement after a predetermined maximum change of ride height has occurred and/or after a maximum period of time has elapsed since said decisive EOJ event detection, or when the vehicle reaches said access ride height; and, optionally, said ceasing may be after between 2 and 4 seconds, or after 3 seconds, and/or after between 25 and 40 mm of change in ride height of the vehicle.

Said adjustment of the suspension system in said first movement may cease after a predetermined maximum change of ride height has occurred, optionally after between 15 and 25 mm of change in ride height of the vehicle, further optionally after 18 mm, and/or after a maximum period of time has elapsed since said detection of said preliminary EOJ event.

The method may further comprise detecting inhibit parameters of the vehicle and, on detection of one or more of said inhibit parameters, preventing said adjusting of the suspension system in said first and/or second movements. An inhibit parameter may comprise one or more of:
a) detection of a previous event of the ignition system being switched off without a subsequent door opening event before re-engagement of the ignition;
b) detection of a seat belt of the vehicle being unbuckled without a subsequent corroborative event occurring;
c) detection of inadequate capacity of the suspension system to reverse the change in vehicle ride height should manual intervention of the ride-height adjustment system be effected;
d) detection of uneven ground or sloped ground on which the vehicle is positioned;
e) detection of ground or jack contact of the body of the vehicle;
f) detection of vehicle wading; and
g) detection of towing.

Said corroborative event may be selected from:

the vehicle coming to a halt after said seat belt of the vehicle has been unbuckled within a predetermined period of time, optionally within one minute; and a vehicle EOJ prediction system predicts an EOJ event with a required level of confidence.

The invention also provides an electronic controller for a vehicle having a storage medium associated therewith storing instructions that when executed by the controller causes the ride height of the vehicle to be adjusted in accordance with the method defined above. The storage medium may be a non-transitory computer readable media.

Although the present invention is concerned with automatically reducing ride height at the end of a journey, nevertheless, manual reduction of ride height is not ruled out as an additional possibility and the ability to stop lowering and to raise the suspension manually is desirable. It may be a requirement of the ride-height adjustment system that there is capacity in the suspension system to reverse any movement made automatically by the controller.

Furthermore, additional safety features may be provided to limit application of the system. For example, if the terrain over which the vehicle is presently positioned is rough, such that wheels are at different heights, or the ground is sloped, or if the vehicle is wading in water, or if there is ground contact with the body of the vehicle, or if it is detected (for example by detection of electrical connection or other known methods) that the vehicle is towing a trailer or the like, the system of the present invention may be disabled.

Any controller, controllers, or electronic control units described herein may suitably comprise a control unit or computational device having one or more electronic processors (e.g., a microprocessor, a microcontroller, an application specific integrated circuit (ASIC), etc.), each of which is configured to execute instructions for software, firmware, programs, algorithms, scripts, applications, etc. that are stored in or on, for example, an electronic memory device that is part thereof or accessible thereby, and may govern all or part of the methodologies described herein. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller or electronic control unit, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A first controller may be implemented in software run on one or more processors. One or more other controllers may be implemented in software run on one or more processors, optionally the same one or more processors as the first controller. Other suitable arrangements may also be used.

According to another aspect of the invention for which protection is sought there is provided a vehicle incorporating a ride-height adjustment system as described above, arranged to effect the method as described above, or incorporating an electronic controller as described above.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention are further described hereinafter, by way of example only, with reference to the accompanying drawings, in which.

DETAILED DESCRIPTION

Figure 1:
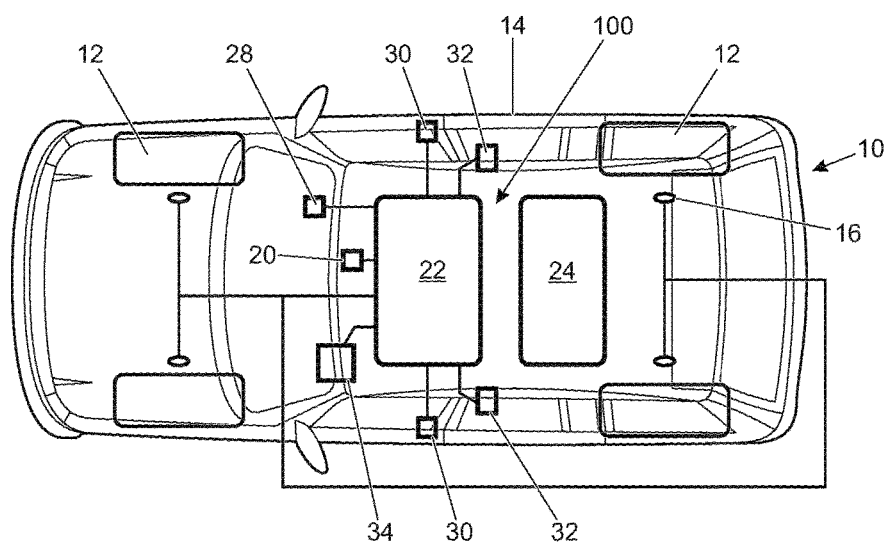
FIG. 1 is plan schematic view of a vehicle incorporating a system in accordance with an example of the present invention.
Figure 2:
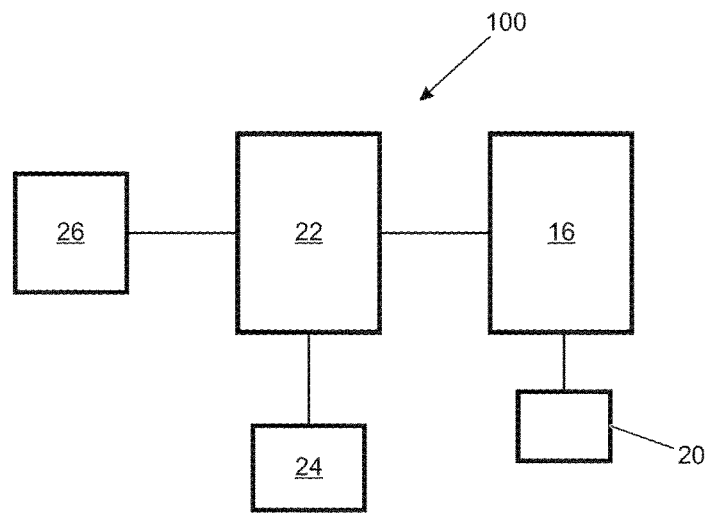
FIG. 2 is a block diagram showing a ride height adjustment system in accordance with an embodiment of the present invention.

In FIGS. 1 and 2, a vehicle 10 comprises wheels 12 connected to a body 14 of the vehicle via an adjustable suspension system 16, which may comprise an air-powered system of known type and requiring no further elucidation here. However, by operating the suspension system 16, the ride height of the vehicle 10, being the height of the body 14 above the ground when resting on its wheels 12 on level ground, can be raised or lowered. The raising and lowering may be done manually with a switch 20. The switch 20 may be connected directly to the suspension system 16, as shown in the block diagram in FIG. 2, or it may be connected to a controller 22 of an automatic ride-height adjustment system 100 in accordance with the present invention, as shown in FIG. 1. The controller 22 has a memory 24 in which instructions are stored for operating the controller. The controller also has a plurality of inputs 26 which cause it to operate the suspension system in accordance with the instructions in the memory 24.

The inputs 26 comprise:

Manually operable switch 20 (in FIG. 1);

An ignition-On/Off detector 28;

Door opening detectors 30 (only two shown in FIG. 1, although a detector could be used on any and all passenger doors;

Seat belt Buckled/Unbuckled detectors 32 (again, only two shown but more may be employed);

End-of-Journey prediction system 34

Other detectors (not shown but described further below)

Figure 3:
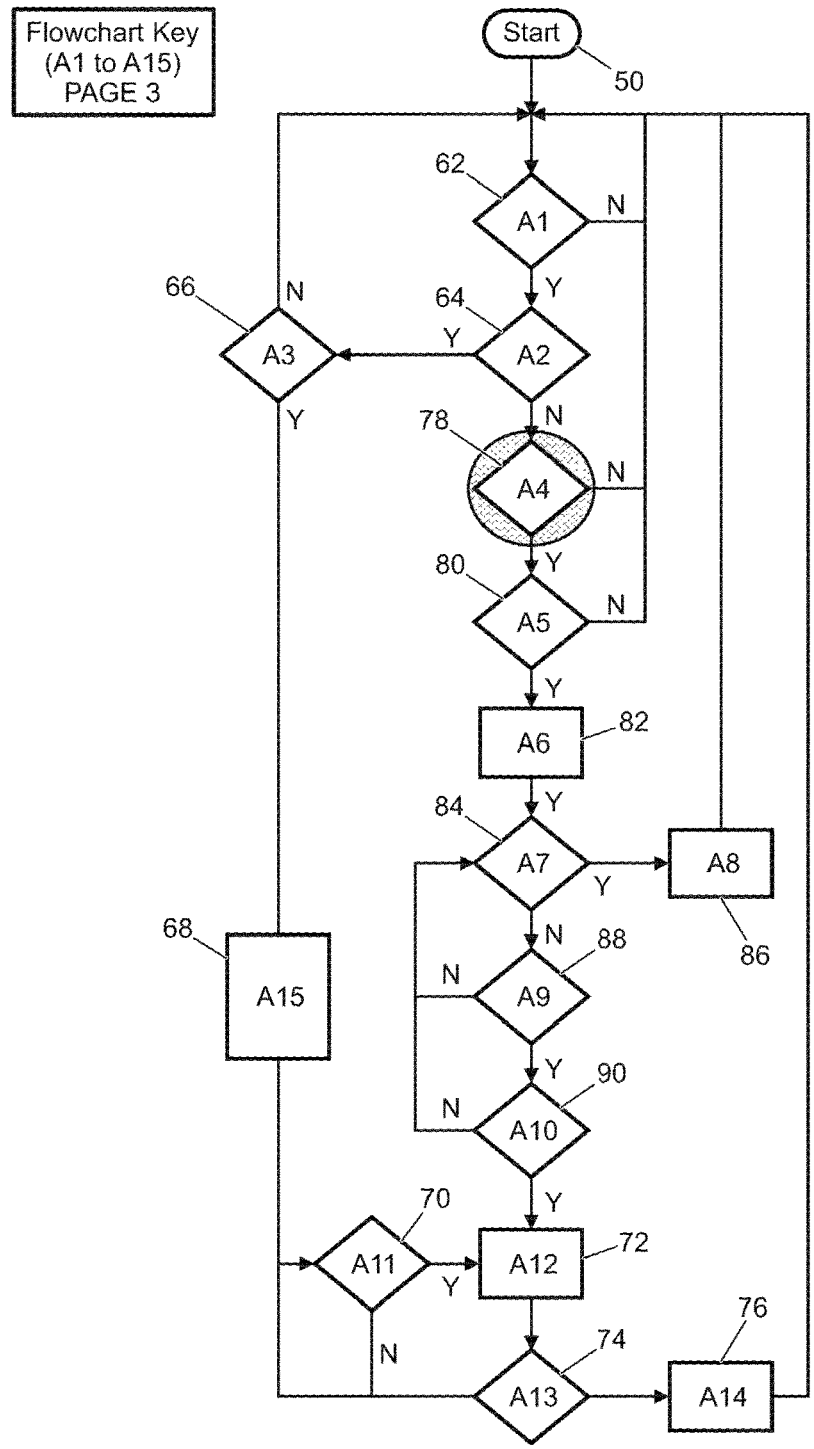
FIG. 3 is a schematic flow diagram of the steps involved in a system in accordance with an example of the present invention.

Turning to FIG. 3, the following procedure may be followed in the course of a vehicle journey in which the system 100 is fitted and when the journey approaches its end:

At the Start 50, the first step is to detect if the Auto-Access vehicle ride height adjustment system 100 is enabled. Enablement may be achieved through a vehicle set-up menu (not described herein) or some other appropriate means. If it is not enabled, the entire remaining process is avoided and the system maintains the suspension in its set position. The set position depends on the vehicle and may comprise any one of Sport, Road, Off-Road, Extended or other setting including Terrain Response (TM), an automatic system (not described further herein) which automatically sets the suspension (among other things) in response to changes detected in the terrain being traversed by the vehicle. Sport-mode may comprise a low ride height to lower the centre of gravity to facilitate fast cornering. Road-mode may be considered a normal mode at intermediate ride height for maximum comfort and handling on metalled surfaces. Off-Road-mode may comprise a relatively high ride height to give ground clearance on rough terrain. Extended-mode may be at maximum ride height for use over extremely rough terrain or when wading in deep water.

If the system is enabled, the controller first checks 62 to establish the current state of the suspension. If not in a certain condition, the system does not proceed any further until it is at "normal" or a "Speed Lowered" height (which may be a lowered height for high speed of SUV type vehicles, where normal height is still relatively highly elevated). When normal or speed lowered suspension height is detected, the doors are checked in step 64 to establish if they are open. If the doors are open, then this is because the system has not anticipated the end of the journey which has occurred unexpectedly. In this scenario, in step 66, all the conditions for lowering the suspension are checked and provided these are affirmative, the system, in step 68 lowers the suspension in one of the following ways:

1. Go to Full Access height
2. Go to defined height close to Full Access height
3. Go towards Full Access height for defined time period, e.g. 3 seconds.

Which mode is selected depends on the setting of the suspension when step 66 is invoked and how the system of the invention is set. For example, it may be that, in this mode, with the doors open, only a predefined drop of height (for example 35 to 40 mm) will be permitted, which may not be sufficient to reach Full Access height (Option 2), or the lowering will only occur for 3 seconds (Option 3) which may be considered a safe limit to minimize the possibility of an occupant of the vehicle trapping themselves under a lowering door. However, it may be that the suspension is already low and the vehicle can be lowered to its Full Access height (Option 1). Full Access height is, of course, the suspension position that most easily facilitates egress of occupants from the vehicle, which may a fully lowered position, perhaps 50 mm below normal operating position of the vehicle body.

After step 68, the driver may still manually select Full Access height in step 70, which if selected is effected in step 72. And, whether or not he/she has done so, should a condition be detected in step 74 that the Auto-Access system of the present invention should be exited, the suspension is changed to its normal height in step 76, or such other height as set or determined by the Terrain Response (TM) system. At this point, the system reverts back to the Start 50.

Returning to step 64, if the doors are not opened when the system is in Auto-Access mode and the suspension is in its normal or Speed Lowered position, then step 78 detects whether or not an EOJ event is about to happen, that is, whether the system determines that passengers are about to disembark. This occurs when, for example, the seat belts are unbuckled or the ignition is disabled or when an EOJ event predictor determines that an EOJ event is about to occur with sufficient probability. If none of these conditions prevail, the system returns to the Start 50 but when they do and all Auto-Access conditions are satisfied (tested in step 80, which if not satisfied reverts the system back to the Start 50) the system lowers the suspension by a first amount in step 82. That amount may be 18 mm below normal ride height.

The speed of the vehicle is then tested in step 84 and if it exceeds 40 kph (or another predetermined speed), the system reverts the suspension to normal ride height in step 86 and returns the system to the Start 50. However, if the speed does not exceed 40 kph, the state of doors of the vehicle is tested in step 88. If they are not open, the system cycles back to the speed test of step 84 until such time as the doors are opened. If, then, all the Auto-Access conditions are satisfied, tested in step 90, the suspension is lowered to its Full Access height in step 72, whereupon the system follows the procedure described above. However, if any one of those conditions are not satisfied, the system reverts to the speed test in step 84.

Steps 66, 74, 80 and 90 are all the same step of testing that the vehicle is in a condition where the Auto Access can be invoked. These have been described above and are listed below under the title "Precautions". This is a non-limiting non-exhaustive list of vehicle states that may or may not be required to pertain.

In summary:
Auto Access High Level Functionality Description
    If vehicle is moving slowly (<2 kph) AND suspension at Normal On-Road height AND (any seat belt disconnected or ignition turned off) THEN lower suspension by 18 mm
    When a door is opened, then lower to full Access height (50 mm below Normal height)
        If the 18 mm lowered suspension height has not been activated before opening a door then the suspension will lower to an Access height 35 mm to 40 mm below Normal height instead Precautions
The Auto Access functionality may include the following precautions:
    Feature can be turned on and off by the customer
    Height change while doors are open only allows a limited height change (up to 40 mm) or a limited time (3 seconds)
    Lowering to access when doors opened is only available for a limited time after car comes to rest (90 seconds) If vehicle is stationary longer than this then it must be moved or the Auto Access function re-enabled
    Auto Access is disabled on uneven or sloping ground
    Auto Access is disabled if the vehicle has not moved since the ignition was switched on. This step protects against inadvertent change of the suspension if the engine is just switched on and off, and at the immediate start of a journey
    Auto Access is not enabled unless there are sufficient pneumatic resources to re-lift the suspension. This is satisfied if the system reservoir pressure is above a threshold or compressor is sufficiently cool to be instantly activated
    Auto Access will be disabled if the air suspension has detected wading, trailing, or body grounding conditions (this will result in a reduction of the pressure exerted on the system through one or more of the wheels)
    Auto Access can be disabled in manually selected Terrain Response modes (high range and low range disable flags are independently tunable)
    If Auto Access has been activated, then suspension re-lifting is allowed up to 3 minutes after the ignition is turned off Height changes are normally disabled 90 seconds after ignition is switched off or when the driver's door is opened, whichever comes first During or after an Auto Access activation a single, short press on the suspension raise switch will make the suspension height go straight back to Normal height Suspension raising (and lowering) may be enabled when doors are open, provided the switches are pressed and held (under normal circumstances it is undesirable to permit raising and lowering while the doors are open, but in the event that Auto Access lowers the vehicle onto a person or obstacle it is necessary to enable it to be lifted off without needing to close the doors (which might not be possible)

Although described herein in detail as lowering the suspension system from a higher level to an access level, for example as appropriate for SUV or other high vehicles, when the invention is used in a sports car or performance vehicle it will be appreciated that the suspension may be raised to access height, i.e. the first movement causes an initial raising of the suspension to an intermediate level and the second movement causes a second raising of the suspension to the full access height so that the vehicle is not so low, thereby facilitating a driver or passenger when egressing from the vehicle. In such a vehicle wherein the suspension is raised to access height as opposed to lowered the invention will operate as described herein except in so far as it will be raised in two stages as opposed to lowered in two stages when transitioning from normal height to access height.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A ride-height adjustment system for a vehicle, the system comprising:
    a suspension system, which is adjustable to change a ride height of the vehicle in which the suspension system is fitted;
    a first detector, to automatically detect a preliminary end-of-journey (EOJ) event indicative of a preliminary expectation of an end of a journey;
    a controller, to adjust the suspension system in a first movement in response to automatic detection of said preliminary EOJ event, to change the ride height of the vehicle towards an access ride height of the vehicle, which access ride height is a predetermined ride height that facilitates egress from and entrance to the vehicle; and
    a second detector, to automatically detect a decisive EOJ event indicative of a decisive expectation of the end of the journey, wherein, when the ride height of the vehicle remains different from the access ride height after said first movement, the controller is adapted to further adjust the suspension system in a second movement in response to said decisive EOJ event detection, to further change the ride height of the vehicle towards said access ride height of the vehicle.

2. A ride-height adjustment system as claimed in claim 1, in which said first and second detectors comprise:
    an electronic processor having an electrical input for receiving signals indicative of said preliminary EOJ event and said decisive EOJ event; and
    an electronic memory device electrically coupled to the electronic processor and having instructions stored therein; wherein
    the processor is configured to access the memory device and execute the instructions stored therein such that the processor is operable in response to said preliminary EOJ event and decisive EOJ event to adjust the suspension system in said first and second movements.

3. A ride-height adjustment system as claimed in claim 1, in which said decisive EOJ event comprises opening of a door of the vehicle.

4. A ride-height adjustment system as claimed in claim 1, in which said controller is arranged to cease said adjustment of the suspension system in said second movement, said cessation of said adjustment occurring one of (1) after a predetermined maximum change of ride height has occurred, (2) after a maximum period of time has elapsed since said decisive EOJ event detection, and (3) when the vehicle reaches said access ride height.

5. A ride-height adjustment system as claimed in claim 4, in which said second movement is ceased after between 2 and 4 seconds, and/or after between 25 and 40 mm of change in ride height of the vehicle.

6. A ride-height adjustment system as claimed in claim 1, in which said controller is arranged to cease said adjustment of the suspension system in said first movement after a predetermined maximum change of ride height has occurred and/or after a maximum period of time has elapsed since said detection of said preliminary EOJ event.

7. A ride-height adjustment system as claimed in claim 6, in which said first movement is ceased after between 15 and 25 mm of change in ride height of the vehicle.

8. A ride-height adjustment system as claimed in claim 1, in which said changes of ride height are lowerings of the ride height.

9. A ride-height adjustment system as claimed in claim 1, in which said preliminary EOJ event is one of:
    an ignition system of the vehicle being switched off; and
    one or more seat belts of the vehicle being unbuckled.

10. A ride-height adjustment system as claimed in claim 1, further comprising a third detector to detect one or more inhibit parameters of the vehicle to prevent the controller from adjusting the suspension system in said first and/or second movements.

11. A ride-height adjustment system as claimed in claim 10, in which an inhibit parameter comprises one or more of:

a) detection of a previous event of the ignition system being switched off without a subsequent door opening event before re-engagement of the ignition;
b) detection of a seat belt of the vehicle being unbuckled without a subsequent corroborative event occurring;
c) detection of inadequate capacity of the suspension system to reverse the change in vehicle ride height should manual intervention of the ride-height adjustment system be effected;
d) detection of uneven ground or sloped ground on which the vehicle is positioned;
e) detection of ground or jack contact of a body of the vehicle;
f) detection of vehicle wading; and
g) detection of towing.

12. A ride-height adjustment system as claimed in claim 11, in which said corroborative event is selected from:
the vehicle coming to a halt after said seat belt of the vehicle has been unbuckled within a predetermined period of time, and
a vehicle EOJ prediction system predicts an EOJ event with a required level of confidence.

13. A vehicle incorporating a ride-height adjustment system as claimed in claim 1.

14. A method of adjusting the ride height of a vehicle comprising the steps of:
providing the vehicle with a suspension system that is adjustable to change a ride height of the vehicle in which the suspension system is fitted;
automatically detecting a preliminary end-of-journey (EOJ) event indicative of a preliminary expectation of an end of a journey;
using a controller, adjusting the suspension system in a first movement in response to said automatic detection of said preliminary EOJ event, to change the ride height of the vehicle towards an access ride height of the vehicle, which access ride height is a predetermined ride height that facilitates egress from and entrance to the vehicle;
automatically detecting a decisive EOJ event indicative of a decisive expectation of the end of the journey; and
when the ride height of the vehicle remains different from the access ride height after said first movement, further adjusting the suspension system in a second movement in response to said decisive EOJ event detection, to further change the ride height of the vehicle towards said access ride height of the vehicle.

15. A method as claimed in claim 14, in which:
said decisive EOJ event comprises opening of a door of the vehicle; and/or
said preliminary EOJ event is one of:
an ignition system of the vehicle being switched off; and
one or more seat belts of the vehicle being unbuckled.

16. A method as claimed in claim 14, in which said adjustment of the suspension system comprises at least one of:
ceasing in said second movement after a predetermined maximum change of ride height has occurred, said cessation of said second movement occurring one of (1) after a maximum period of time has elapsed since said decisive EOJ event detection, and (2) when the vehicle reaches said access ride height; and
ceasing in said first movement after one of (1) a predetermined maximum change of ride height has occurred, and (2) a maximum period of time has elapsed since said detection of said preliminary EOJ event.

17. A method as claimed in claim 14, further comprising detecting inhibit parameters of the vehicle and, on detection of one or more of said inhibit parameters, preventing said adjusting of the suspension system in said first and/or second movements.

18. A method as claimed in claim 17, in which an inhibit parameter comprises one or more of:
a) detection of a previous event of the ignition system being switched off without a subsequent door opening event before re-engagement of the ignition;
b) detection of a seat belt of the vehicle being unbuckled without a subsequent corroborative event occurring;
c) detection of inadequate capacity of the suspension system to reverse the change in vehicle ride height should manual intervention of the ride-height adjustment system be effected;
d) detection of uneven ground or sloped ground on which the vehicle is positioned;
e) detection of ground or jack contact of a body of the vehicle;
f) detection of vehicle wading; and
g) detection of towing.

19. A method as claimed in claim 18, in which said corroborative event is selected from:
the vehicle coming to a halt after said seat belt of the vehicle has been unbuckled within a predetermined period of time, and
a vehicle EOJ prediction system predicts an EOJ event with a required level of confidence.

20. An electronic controller for a vehicle having a storage medium associated therewith storing instructions that when executed by the controller causes the ride height of the vehicle to be adjusted in accordance with the method of claim 14.

* * * * *